(12) United States Patent
Henry

(10) Patent No.: US 8,159,933 B2
(45) Date of Patent: *Apr. 17, 2012

(54) METHOD AND SYSTEM FOR PROVIDING BROADBAND ACCESS TO A DATA NETWORK VIA GAS PIPES

(75) Inventor: Paul Shala Henry, Holmdel, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/020,975

(22) Filed: Feb. 4, 2011

(65) Prior Publication Data

US 2011/0188590 A1    Aug. 4, 2011

Related U.S. Application Data

(63) Continuation of application No. 11/789,290, filed on Apr. 24, 2007, now Pat. No. 7,894,329.

(51) Int. Cl.
*H04J 11/00*    (2006.01)

(52) U.S. Cl. ...................................... 370/208

(58) Field of Classification Search .......... 370/203–211, 370/328, 339, 463, 465
See application file for complete search history.

(56) References Cited

U.S. PATENT DOCUMENTS

| | | | | |
|---|---|---|---|---|
| 6,396,803 | B2* | 5/2002 | Hornsby et al. | 370/208 |
| 6,933,835 | B2* | 8/2005 | Kline | 375/258 |
| 2007/0002772 | A1* | 1/2007 | Berkman et al. | 370/257 |
| 2007/0105582 | A1* | 5/2007 | McCorkle | 455/522 |
| 2007/0300277 | A1* | 12/2007 | Lobbert et al. | 725/118 |

OTHER PUBLICATIONS

Reardon, Gas pipe brief? C/NETNEWS.COM, 3 pages, Nov. 2005.*
Garber, Internet News Brief, IEEE, 3 pages, Feb. 2006.*

* cited by examiner

*Primary Examiner* — Frank Duong

(57) ABSTRACT

A method and system for providing broadband access to a data network via gas pipes is disclosed. Embodiments of the present invention utilize Orthogonal Frequency-Division Multiplexing (OFDM) or Frequency-Division Multiplexing (FDM) as a modulation technique in order to protect against the effects of dispersion in the gas pipes. An OFDM transceiver modulates a digital data stream into an OFDM signal, RF up-converts the OFDM signal, and transmits the RF up-converted OFDM modulated signal through a gas pipe.

19 Claims, 4 Drawing Sheets

METHOD AND SYSTEM FOR PROVIDING BROADBAND ACCESS TO A DATA NETWORK VIA GAS PIPES

This application is a continuation of U.S. patent application Ser. No. 11/789,290, filed Apr. 24, 2007, which is incorporated herein by reference.

BACKGROUND OF THE INVENTION

The present invention is generally directed to broadband access to a data network. More specifically, the present invention is directed to broadband access to a data network via gas mains used for the distribution of natural gas.

Broadband access to a data network refers to transmission of data into and out of the data network at a high data transmission rate. Conventionally, service providers offer broadband access through wired technology, such as cable modem or DSL, or wireless technology, such as satellite or 3G cellular technologies. Many developments have been made in order to increase bandwidth and transmission rates in conventional wired and wireless technologies.

Recently, the use of municipal gas pipes, which distribute natural gas to homes and businesses, has been proposed for broadband access to data networks. By using gas pipes to provide broadband access, it is possible to achieve transmission bandwidths much larger than conventional wired and wireless technologies. In addition, it has been shown that signal attenuation in gas pipes is tolerable over practical distances.

United States Patent Application No. 2006/0165127 ("Nunally"), entitled "System and Method for Broadband Network Communication Through Operational Natural Gas Infrastructures" describes a proposed implementation for broadband access using gas pipes. Nunally describes an architecture which employs Ultra Wideband (UWB) signals, also called impulse radio, for transmitting a broad frequency band of data through gas pipes. The gas pipes serve as wave guides for the UWB signals.

BRIEF SUMMARY OF THE INVENTION

The present inventor has recognized the use of gas pipes as a waveguide causes significant dispersion in signals transmitted within the gas pipes. The present inventor has recognized that that the waveguide dispersion in gas pipes is so severe that Ultra Wideband (UWB), the transmission technology utilized in previously proposed implementations, may not be viable. Although using UWB signals is technically possible, UWB signals include a broad range of frequencies, and are thus highly susceptible to the effects of waveguide dispersion. Thus, conventional approaches may not be economically viable because dispersive effects in reasonable lengths of gas pipes will severely limit usable bandwidth.

The present invention provides a method and system capable of efficiently providing broadband access via gas pipes. Embodiments of the present invention utilize Orthogonal Frequency-Division Multiplexing (OFDM) or Frequency-Division Multiplexing (FDM), which are well known, as a modulation technique for transmitting digital data through gas pipes. Since, OFDM and FDM transmit data using a plurality of small frequency bands, instead of a single large frequency band as used in UWB, the effect of waveguide dispersion in the gas pipes is negligible on each of the frequency bands. Thus, digital data streams modulated into OFDM or FDM signals can be transmitted through gas pipes with minimal dispersion.

In an embodiment of the present invention, an OFDM transceiver modulates a digital data stream into an OFDM signal, RF up-converts the OFDM signal, and transmits the RF up-converted OFDM signal through a gas pipe. Another OFDM transceiver receives the RF up-converted OFDM signal within a gas pipe, RF down-converts the received OFDM signal, and demodulates the RF down-converted OFDM signal to obtain the digital data stream.

In another embodiment of the present invention, a gas main infrastructure includes one or more gas pipes. A first OFDM transceiver has an antenna extending into one of the gas pipes to transmit an OFDM signal including a digital data stream into the gas main infrastructure. A second OFDM transceiver has an antenna extending into one of the gas pipes to receive the OFDM signal including the digital data stream. The second OFDM transceiver can then transmit the digital data stream externally of the gas pipes using a wireless or wired technology.

These and other advantages of the invention will be apparent to those of ordinary skill in the art by reference to the following detailed description and the accompanying drawings.

DETAILED DESCRIPTION

Figure 1:
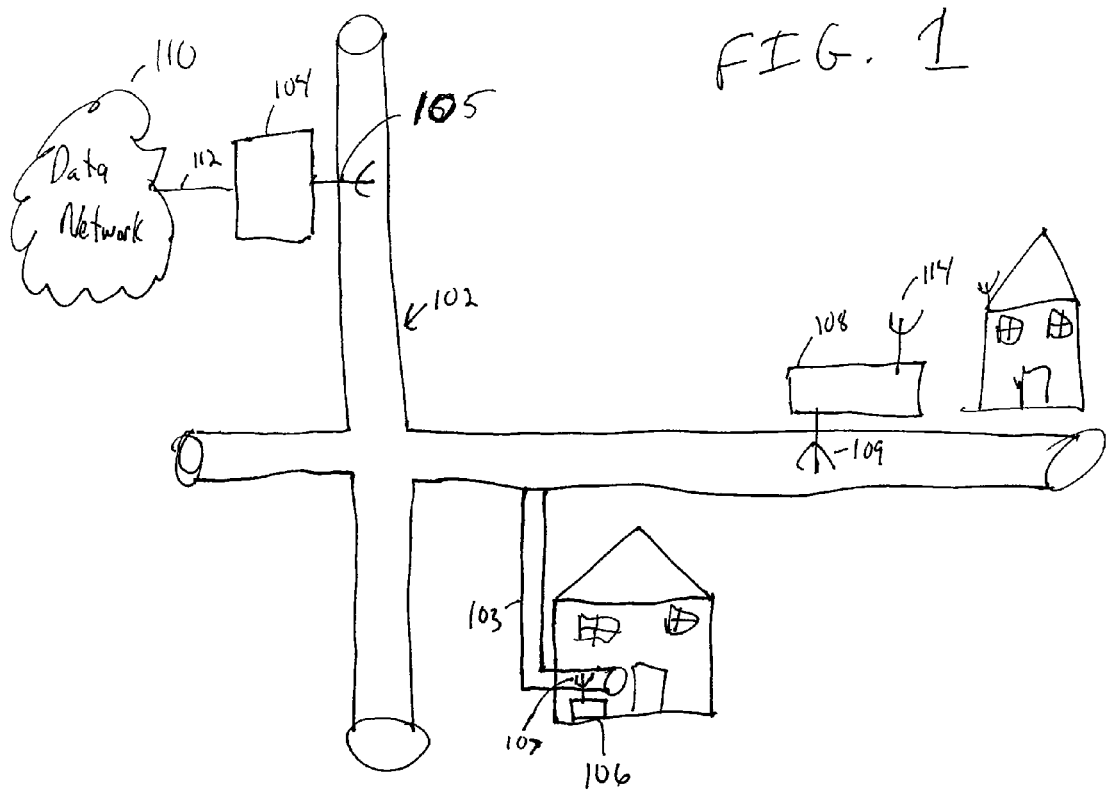
FIG. 1 illustrates a system for providing broadband access using an infrastructure of gas mains according to an embodiment of the present invention.

FIG. 1 illustrates a system for providing broadband access to a data network using an infrastructure of gas mains 102 according to an embodiment of the present invention. The gas mains 102 are pipes used for the distribution of natural gas. These pipes are typically buried underground. Orthogonal Frequency-Division Multiplexing (OFDM) transceivers 104, 106, and 108 transmit and receive OFDM modulated signals through the gas mains 102. OFDM Transceivers 104, 106, and 108 each include an antenna (or probe) 105, 107, and 109, respectively which extends into the gas mains 102 for transmitting and/or receiving OFDM modulated radio waves within the gas mains 102. As illustrated in FIG. 1, OFDM transceiver 104 is connected to a data network 110, and can access digital data from the data network 110. The digital data can include various types of digital data such as, Internet content, digital cable television signals, etc. This digital data can be distributed to the various customer premises and can include data associated with many users. OFDM transceivers 106 and 108 will process this data, but typically will pass along to the user only the portion of the data intended for the specific user or users at the transceiver location. As illustrated in FIG. 1, OFDM transceiver 104 is connected to the data network 110 via an optical fiber 112. Although not shown in FIG. 1, it is to be understood that additional equipment may be utilized to connect the OFDM transceiver 104 to the data network 110. According to an embodiment of the present invention, OFDM transceiver 104 accesses digital data from the data network 110, modulates the digital data into OFDM signals, and transmits the OFDM signals as radio waves through antenna 105, which extends into gas main 102. The OFDM signals transmitted as radio waves by OFDM transceiver 104 travel in both directions from OFDM transceiver 104 inside of the gas main 102. Thus, OFDM transceiver 106 and OFDM transceiver 108 can receive these radio waves and obtain the digital data included in the OFDM signals.

OFDM transceiver 106 and OFDM transceiver 108 receive the OFDM signals transmitted as radio waves through the gas main 102 by OFDM transceiver 104. OFDM transceivers 106 and 108 receive these radio waves within the gas main 102 through antennas 107 and 109, respectively, which extend into the gas main 102. According to one embodiment of the present invention illustrated by OFDM transceiver 106, the OFDM transceiver 106 can be located at a customer premise, such as a home of a user. For example, the OFDM transceiver 106 can receive the OFDM signal transmitted as radio waves from a gas pipe 103 that extends into in a home of a user. The gas pipe 103 can also supply natural gas to the home of the user. Thus, the user is provided with broadband access to digital data from data network 110 using OFDM transceiver 106 located at gas pipe 103 inside the home of the user. However, this embodiment may not be practical in cases in which residential gas lines are too small to effectively transmit the OFDM signals. As the size of a gas pipe decreases, the frequency necessary for the radio waves to propagate within the gas pipe increases. However, the higher the frequency, the more rapid is the loss of energy as the radio waves propagate. For example, a gas pipe that is 1 inch in diameter may only be able to support signals above about 7 GHz. This frequency is so high that the signal loss along the length of the pipe may be intolerable.

According to another embodiment of the present invention illustrated by OFDM transceiver 108, the OFDM transceiver 108 may receive the OFDM modulated signal transmitted through the gas main 102 outside of a customer premise. In this case, the OFDM transceiver 108 can transmit the broadband data obtained from the OFDM modulated signal using a wireless technology, such as WiMax, WiFi, etc., such that users within a range of the OFDM transceiver 108 can access the broadband data. The OFDM transceiver 108 may be equipped with a second antenna 114 for transmitting the broadband data outside of the gas main 102 using the wireless protocol, in addition to the antenna 109 for transmitting/receiving radio waves inside of the gas main 102. It is also possible that a wired connection, such as copper (coax or twisted pair) or optical fiber, could be established between a home of a user and an OFDM transceiver.

Although OFDM transceiver 104 is described as transmitting high frequency OFDM modulated signals within the gas mains 102, and OFDM transceivers 106 and 108 are described as receiving high frequency OFDM modulated signals within the gas mains 102, it is to be understood that each of the OFDM transceivers 104, 106, and 108 is bidirectional and capable of transmitting and receiving OFDM modulated signals through the gas mains 102. Accordingly, OFDM modulated signals can be propagated through an infrastructure of gas mains by a network of OFDM transceivers receiving a OFDM modulated signal within the gas mains and re-transmitting the received OFDM modulated signal through the gas mains.

Although the embodiments of the present invention are described herein as employing OFDM as a modulation technique for the transmitted broadband data, the present invention is not limited to OFDM, and may be alternatively implemented using any frequency-division multiplexing (FDM) technique that allows the transmitted radio signal to be broken into subbands small enough so that waveguide dispersion is manageable.

Figure 2:
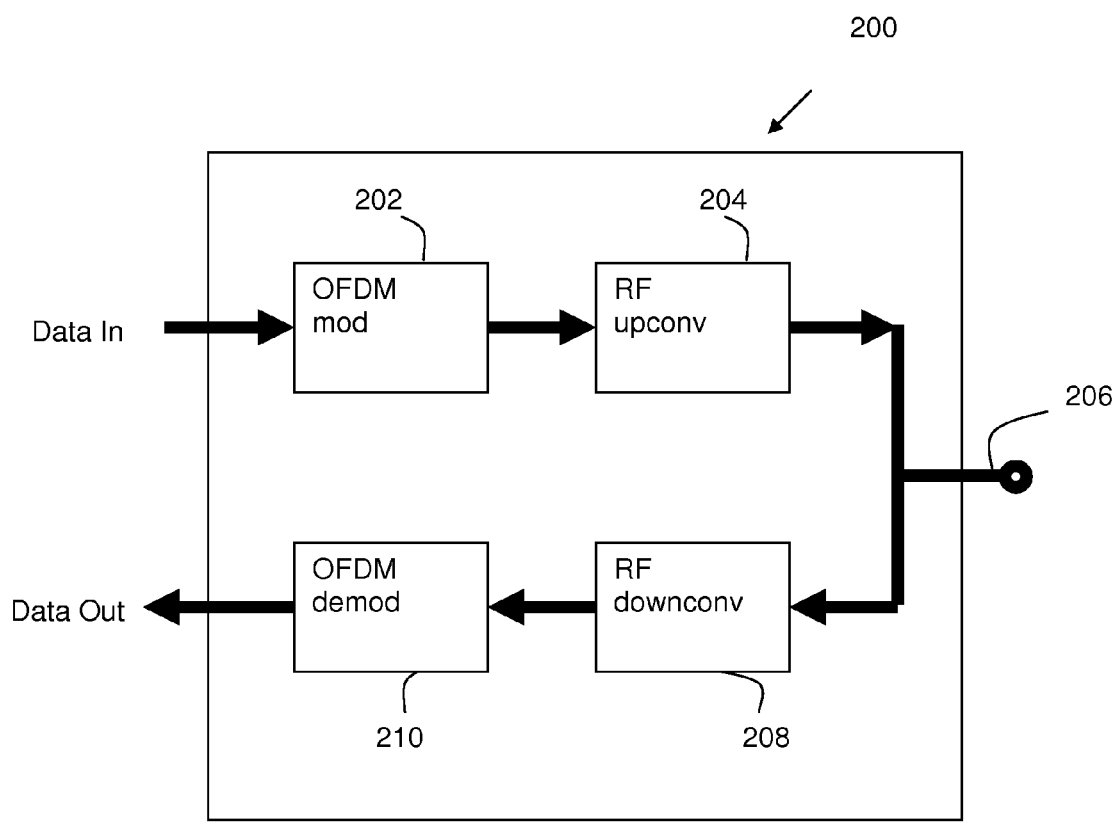
FIG. 2 illustrates a functional block diagram of an OFDM transceiver according to an embodiment of the present invention.

FIG. 2 illustrates a functional block diagram of an OFDM transceiver 200. As illustrated in FIG. 2, the OFDM transceiver 200 includes an OFDM modulator 202 for modulating an input digital data stream into an OFDM signal. The OFDM signal includes a plurality of closely spaced orthogonal radio frequencies, each of which is modulated with a portion of the digital data stream. An RF up-converter 204 converts the OFDM signal to an RF up-converted OFDM signal which is centered at a higher frequency than the original OFDM signal. In order for a signal to be effectively transmitted through a gas pipe, the wavelength of the signal must be smaller than approximately 1.7 times the diameter of the gas pipe. Accordingly, the frequency of the signal must be high enough to achieve a small enough wavelength. For example, a 3-inch gas main can carry signals at frequencies higher than about 2.3 GHz. Smaller pipes require proportionally smaller wavelengths and therefore higher frequencies. The RF up-conversion converts the OFDM signal into an OFDM signal centered at a frequency high enough for the RF up-converted OFDM signal to be transmitted through the gas pipes. According to an embodiment of the present invention the RF up-converter 204 may convert the OFDM modulated signal into a microwave signal. The RF up-converted OFDM signal is transmitted as a radio wave through an antenna 206.

The antenna 206 can extend into a gas main to transmit radio waves through the gas main and receive radio waves transmitted inside the gas main. An RF down-converter 208 converts an OFDM signal received as radio waves via the antenna 206 into an RF down-converted OFDM signal, which is centered at a lower frequency than the received OFDM signal. In most cases, an OFDM signal which is transmitted through a gas pipe will be centered at too high a frequency for the OFDM transceiver 200 to accurately demodulate directly. Accordingly, RF down-conversion is performed on the OFDM signal in order to convert the OFDM signal into an OFDM signal which is centered at a low-enough frequency to be satisfactorily demodulated. An OFDM demodulator 210 demodulates the RF-down converted OFDM signal to obtain a digital data stream contained therein. The OFDM demodulator demodulates each of the orthogonal frequencies of the RF down-converted OFDM signal, and reconstructs the digital data stream from data contained in each of the frequencies. According to an embodiment of the present invention, the OFDM transceiver 200 may be implemented using a WiMax (IEEE 802.16) transceiver. However, the present invention is not limited to a WiMax transceiver, and may be implemented using any transceiver that utilizes OFDM modulation.

As described above, the OFDM signal includes a plurality of radio frequencies which are transmitted through the gas pipes. Each of the radio frequencies of the OFDM signal includes a portion of the digital data stream. Accordingly, the digital data stream is divided into portions, and each portion is transmitted using a separate frequency band. Since each OFDM frequency band is relatively small, the dispersive effects of the pipes on each of the frequency bands are small and easily managed using equalization techniques that are well known in the art. (See, for example, J. G. Proakis, "Digital Communications", McGraw-Hill 1995, Chaps 10 and 11.)

Figure 3:
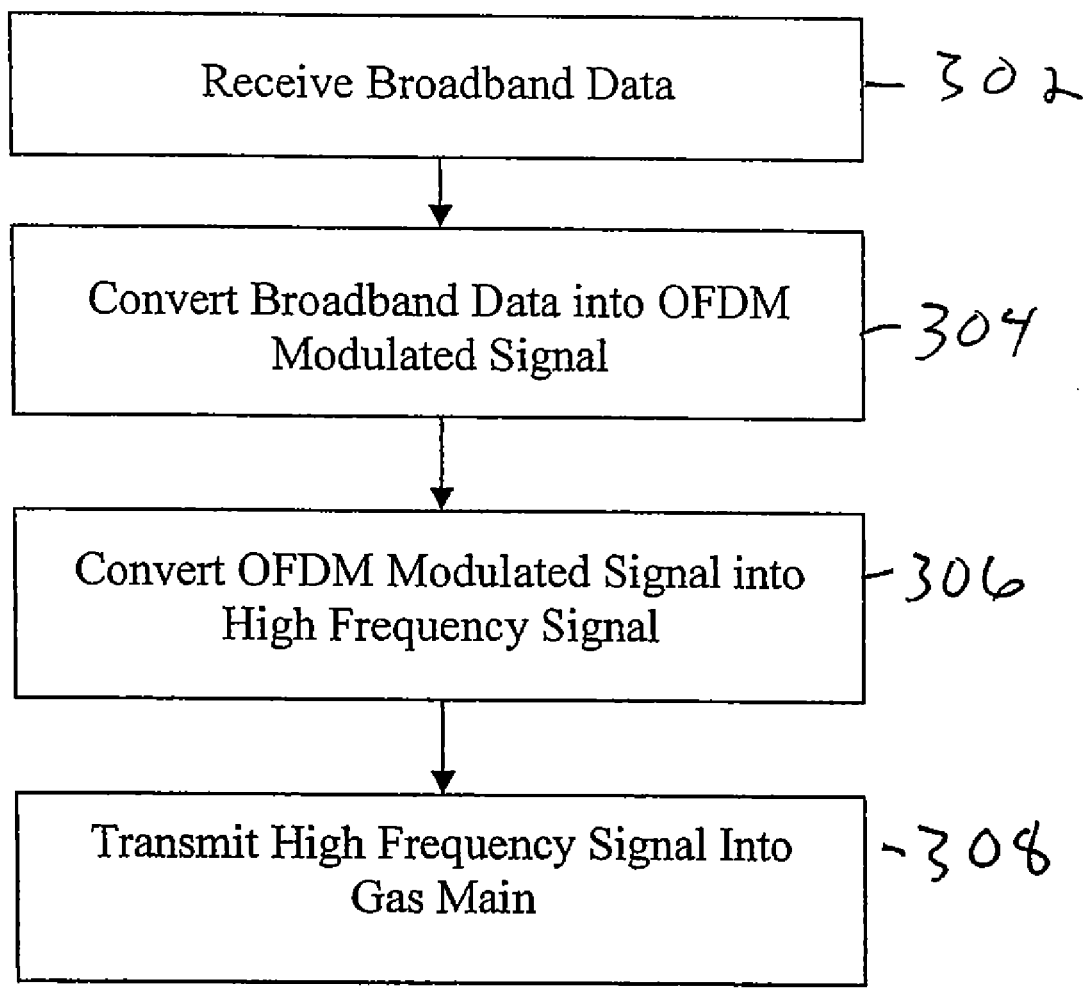
FIG. 3 illustrates a method of transmitting digital data via gas mains according to an embodiment of the present invention.

FIG. 3 illustrates a method of transmitting digital data via gas mains according to an embodiment of the present invention. At step 302, an OFDM transceiver receives a digital data stream. For example, as illustrated in FIG. 1, OFDM transceiver 104 accesses a digital data stream from the data network 110. It is also possible that OFDM transceiver 106 or 108 can receive a digital data from customer premises equipment. At step 304, the OFDM transceiver modulates the broadband data into an OFDM signal. At step 306, the OFDM transceiver converts the OFDM signal into an RF up-converted OFDM signal centered at a higher frequency than the OFDM signal. According to an advantageous embodiment of the invention, the RF up-converted OFDM signal is a microwave signal, but the present invention is not limited thereto. At step 308, the OFDM transceiver transmits the RF up-converted OFDM signal as radio waves through the gas mains. For example, the RF up-converted OFDM signal can be transmitted through the gas mains using a wireless protocol, such as WiMax. The radio waves can be transmitted from an antenna extending into the gas mains and travel within the gas mains in all directions from the antenna. Thus, the gas mains effectively serve as a waveguide for the radio waves.

Figure 4:
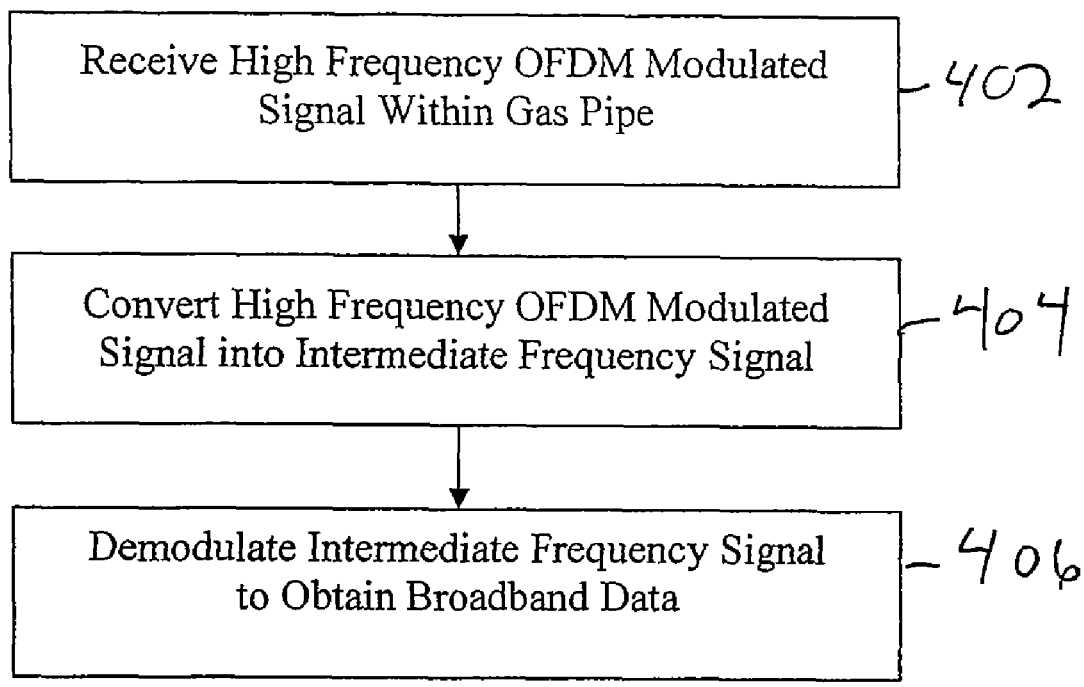
FIG. 4 illustrates a method of receiving digital data via gas mains according to an embodiment of the present invention.

FIG. 4 illustrates a method receiving digital data via gas mains according to an embodiment of the present invention. At step 402, an OFDM transceiver receives radio waves including an OFDM signal via a gas pipe. For example, as illustrated in FIG. 1 OFDM transceiver 106 and OFDM transceiver 108 receive OFDM signals through antennas 107 and 109, respectively, which extend into the gas main 102. At step 404, the OFDM transceiver converts the OFDM signal into an RF down-converted OFDM signal, which is centered at a lower frequency than the received OFDM signal. At step 406, the OFDM transceiver demodulates the RF down-converted OFDM signal to obtain digital data included in the signal. For example, as illustrated in FIG. 1, OFDM transceivers 106 and 108 can obtain digital data from the data network 110 that is transmitted through the gas mains 102 by OFDM transceiver 104.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method of transmitting data via a gas pipe comprising:
   up-converting, by an up-converter, an orthogonal frequency-division multiplexing signal to generate an up-converted orthogonal frequency-division multiplexing signal having a wavelength less than about 1.7 times a diameter of the gas pipe; and
   transmitting, by an antenna, the up-converted orthogonal frequency-division multiplexing signal inside the gas pipe with the gas pipe acting as a waveguide.

2. The method of claim 1, further comprising:
   modulating a digital data stream into the orthogonal frequency-division multiplexing signal.

3. The method of claim 2, further comprising:
   transmitting at least a portion of the digital data stream outside of the gas pipe via a wireless protocol.

4. The method of claim 1, wherein the orthogonal frequency-division multiplexing signal comprises a plurality of frequency subbands.

5. The method of claim 1, further comprising:
   receiving a second orthogonal frequency-division multiplexing signal via the gas pipe.

6. The method of claim 1, wherein the up-converted orthogonal frequency-division multiplexing signal is a microwave signal.

7. The method of claim 1, wherein the gas pipe transports natural gas.

8. A method of receiving data via a gas pipe comprising:
   receiving, by an antenna, an orthogonal frequency-division multiplexing signal via a gas pipe, the signal having a wavelength less than about 1.7 times a diameter of the gas pipe; and
   down-converting, by a down-converter, the orthogonal frequency-division multiplexing signal to generate a down-converted orthogonal frequency-division multiplexing signal.

9. The method of claim 8, wherein the orthogonal frequency-division multiplexing signal comprises a plurality of subbands.

10. The method of claim 8, wherein the orthogonal frequency-division multiplexing signal received via the gas pipe is a microwave signal.

11. The method of claim 8, wherein the gas pipe transports natural gas.

12. The method of claim 8, further comprising:
    obtaining a digital data stream from the down-converted orthogonal frequency-division multiplexing signal.

13. An apparatus for transmitting digital data via a gas pipe comprising:
    an up-converter configured to up-convert a first orthogonal frequency-division multiplexing signal to generate an up-converted first orthogonal frequency-division multiplexing signal having a wavelength less than about 1.7 times a diameter of the gas pipe; and
    an antenna configured to:
       transmit the up-converted first orthogonal frequency-division multiplexing signal through the gas pipe; and
       receive a second orthogonal frequency-division multiplexing signal via the gas pipe.

14. The apparatus of claim 13, further comprising a transceiver configured to modulate a digital data stream into the first orthogonal frequency-division multiplexing signal.

15. The apparatus of claim 14, wherein the transceiver comprises a WiMax transceiver.

16. The apparatus of claim 13, wherein the first orthogonal frequency-division multiplexing signal comprises a plurality of subbands.

17. The apparatus of claim 13, wherein the up-converted first orthogonal frequency-division multiplexing signal is a microwave signal.

18. The apparatus of claim 13, wherein the antenna extends inside of the gas pipe.

19. The apparatus of claim 13, wherein the gas pipe transports natural gas.

* * * * *